United States Patent [19]

Kawamura

[11] Patent Number: 4,878,347

[45] Date of Patent: Nov. 7, 1989

[54] DEVICE FOR CONTROLLING TURBOCHARGER WITH ELECTRIC ROTARY MACHINE

[75] Inventor: Hideo Kawamura, Samukawa, Japan

[73] Assignee: Isuzu Motors Limited, Tokyo, Japan

[21] Appl. No.: 225,771

[22] Filed: Jul. 29, 1988

[30] Foreign Application Priority Data

Jul. 30, 1987 [JP] Japan .................... 62-191342

[51] Int. Cl.$^4$ .................................. F02B 37/14
[52] U.S. Cl. ........................... 60/608; 290/52
[58] Field of Search .............. 60/607, 608; 290/52

[56] References Cited

U.S. PATENT DOCUMENTS

| 4,745,755 | 5/1988 | Kawamura | 60/608 |
| 4,757,686 | 7/1988 | Kawamura et al. | 60/608 |

FOREIGN PATENT DOCUMENTS

| 3539782 | 5/1987 | Fed. Rep. of Germany | 60/608 |
| 195330 | 10/1985 | Japan | 60/608 |
| 212622 | 10/1985 | Japan | 60/608 |

*Primary Examiner*—Michael Koczo
*Attorney, Agent, or Firm*—Staas & Halsey

[57] ABSTRACT

A device for controlling a turbocharger having an electric rotary machine confirms present running conditions of a motor vehicle by detecting, at all times, the engine speed, the engine load, and the amount of depression of an accelerator pedal while the motor vehicle is running, and determines whether the electric rotary machine is to operate in a generator mode or a motor mode. If the electric rotary machine is to operate in the motor mode, appropriate electric power is supplied to the electric rotary machine based on the engine load, the accelerator pedal depression, and the speed of rotation of the turbine of the turbocharger, for increasing the speed of rotation of the turbocharger to quickly increase the boost pressure developed by the turbocharger.

4 Claims, 4 Drawing Sheets

DEVICE FOR CONTROLLING TURBOCHARGER WITH ELECTRIC ROTARY MACHINE

BACKGROUND OF THE INVENTION

The present invention relates to a device for controlling a turbocharger having a rotatable shaft on which a motor/generator electric rotary machine is mounted.

There have been proposed various systems in which a turbocharger is mounted on the exhaust pipe of an internal combustion engine on a motor vehicle and has a rotatable shaft to which a motor/generator is directly coupled for the recovery o the energy of exhaust gases.

Japanese Patent Application No. 60-188827 discloses, as one such system, a device for controlling a turbocharger associated with an internal combustion engine to operate the motor/generator selectively as a generator or a motor dependent on the rotational speed o the engine and the load on the engine.

In the proposed device disclosed in the above application, when the motor/generator operates as a generator, an electric load or a battery is supplied with generated electric power, and when the motor/generator operates as a motor, the supercharging operation of the turbocharger is assisted to increase the output power of the engine. The earlier controlling device however does not have a means for optimizing the boost pressure of the turbocharger according to changes in the running conditions of the motor vehicle. Therefore, even when the motor vehicle is running under conditions which require quick acceleration, the turbocharger tends to suffer an insufficient boost pressure, and desired acceleration cannot be achieved.

SUMMARY OF THE INVENTION

It is an object of the present invention to provide a device for controlling a turbocharger with an electric rotary machine to obtain an optimum boost pressure, with a good response, according to the depth to which an accelerator pedal is depressed, which indicates the driver's intention, for thereby improving the acceleration capability of the motor vehicle that is equipped with the turbocharger.

According to the present invention, there is provided a device for controlling a turbocharger with an electric rotary machine, comprising: a turbine mounted on an engine on a motor vehicle and drivable by exhaust gases emitted from the engine; a rotatable shaft coupled to the turbine; a compressor coupled to the rotatable shaft for delivering air under pressure to the engine; an electric rotary machine coupled to the rotatable shaft; an engine speed sensor for detecting the rotational speed of the engine; an engine load sensor for detecting a load on the engine; an accelerator pedal movement sensor for detecting the amount of depression of an accelerator pedal which controls operation of the engine; a boost pressure sensor for detecting the pressure of air supplied to the engine; a turbine speed sensor for detecting the rotational speed of the turbine; a battery mounted on the motor vehicle; means for determining whether the electric rotary machine is in a generator mode or a motor mode based on signals from the engine speed sensor, the engine load sensor, and the accelerator pedal movement sensor; means for calculating electric power to be supplied to the electric rotary machine based on signals from the engine load sensor, the accelerator pedal movement sensor, and the turbine speed sensor when the electric rotary machine is in the motor mode; and means for supplying the electric power calculated by the calculating means from the battery to the electric rotary machine.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
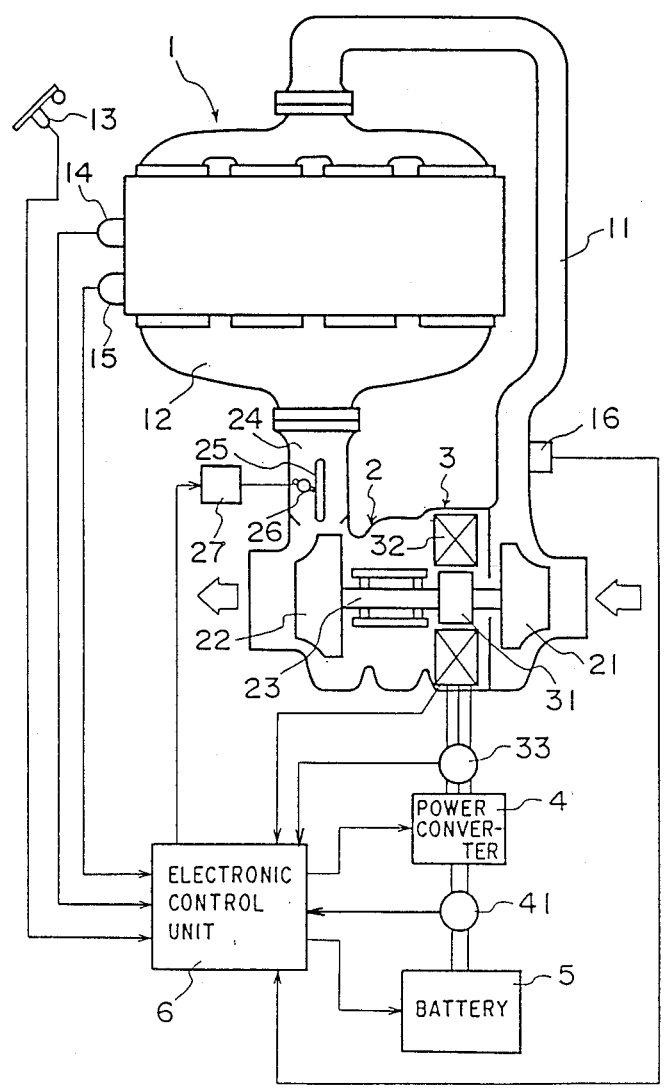
FIG. 1 is a block diagram of a device for controlling a turbocharger with an electric rotary machine according to the present invention.

FIG. 1 shows in block form a device for controlling a turbocharger with an electric rotary machine according to the present invention. FIG. 1 illustrates an internal combustion engine 1 which is operated by the energy produced by combusting supplied fuel with air drawn through an intake pipe 11 for driving a motor vehicle (not shown). Exhaust gases emitted from the engine 1 by fuel combustion are discharged through an exhaust pipe 12. Denoted at 13 is an accelerator pedal movement sensor for detecting the amount of depression of an accelerator pedal, 14 a load sensor for detecting the amount of fuel injected (the load on the engine 1) based on the position of a rack of a fuel injection pump (not shown) of the engine 1, and 15 an engine speed sensor for detecting the rotational speed of the engine 1. These sensors transmit detected signals to an electronic control unit (described later on).

A turbocharger 2 is coupled to the exhaust pipe 12 and the intake pipe 11. The turbocharger 2 has a turbine 22 drivable by exhaust gases and a compressor 21 for delivering intake air into the intake pipe 11. The turbine 22 and the compressor 21 are interconnected by a rotatable shaft 23 on which there is mounted an electric rotary machine 3 that is operable selectively as a motor or a generator. The turbocharger 2 has an exhaust gas inlet pipe 24 coupled to the exhaust pipe 12 and housing a partition 25 which is disposed in an exhaust passage for driving the turbine 22 to divide the exhaust passage into two passageways. An on/off valve 26 is disposed in one of the divided passageways. When the amount of emitted exhaust gases is small, the on/off valve 26 is closed to increase the speed of flow of exhaust gases through the other passageway for driving the turbine 22 at high speed.

The electric rotary machine 3 has a rotor 31 which can be rotated by electric power supplied from a battery 5 through a power converter 4. When the rotor 31 is rotated, the compressor 21 operates to compress intake air and supercharge the engine 1 through the intake pipe 11. The boost pressure developed by the compressor 21 is detected by a boost pressure sensor 16 which transmits its detected signal to the electronic control unit 6.

The power converter 4 has power control circuits such as a rectifying/smoothing circuit for converting AC electric power into DC electric power, a converter circuit for converting the voltage of the DC electric power into AC electric power with its frequency freely regulatable, and a duty factor control circuit for controlling the voltage of electric power with semiconductor control elements. The power converter 4 is electrically connected between the electric rotary machine 3 and the battery 5. The various power control circuits of the power converter 4 are controlled by commands from the electronic control unit 6.

The AC electric power from the electric rotary machine 3 operating as a generator is converted into DC electric power by the rectifying/smoothing circuit of the power converter 4, and the DC electric power is controlled by the converter circuit and the duty factor control circuit so as to be suitable for charging the battery 5. When the electric rotary machine 3 operates as a motor, the DC electric power from the battery 5 is converted by the converter and inverter circuits of the power converter 4 into AC electric power of a prescribed frequency and voltage which is supplied to a stator 32 of the electric rotary machine 3 for assisting the supercharging operation of the turbocharger that is driven by the exhaust gases.

Designated in FIG. 1 at 33 is an AC voltmeter for detecting the voltage across the stator 32 of the electric rotary machine 3, and 41 a DC voltmeter for detecting the DC terminal voltage of the power converter 4. Detected signals from these voltmeters 33, 41 are sent to the electronic control unit 6.

The electronic control circuit 6 comprises a microcomputer having a central processing unit supplied with signals from the various sensor, referred to above, indicating operating conditions of the engine 1 and signals from the voltmeters for effecting arithmetic operations and counting control occurrences or cycles, various memories for storing a map of data indicating the relationship between engine operating conditions and required boost pressures and a program for controlling operation of the electric rotary machine, and an input/output device for receiving various input signals and issuing control commands to an actuator and the power converter.

Figure 2:
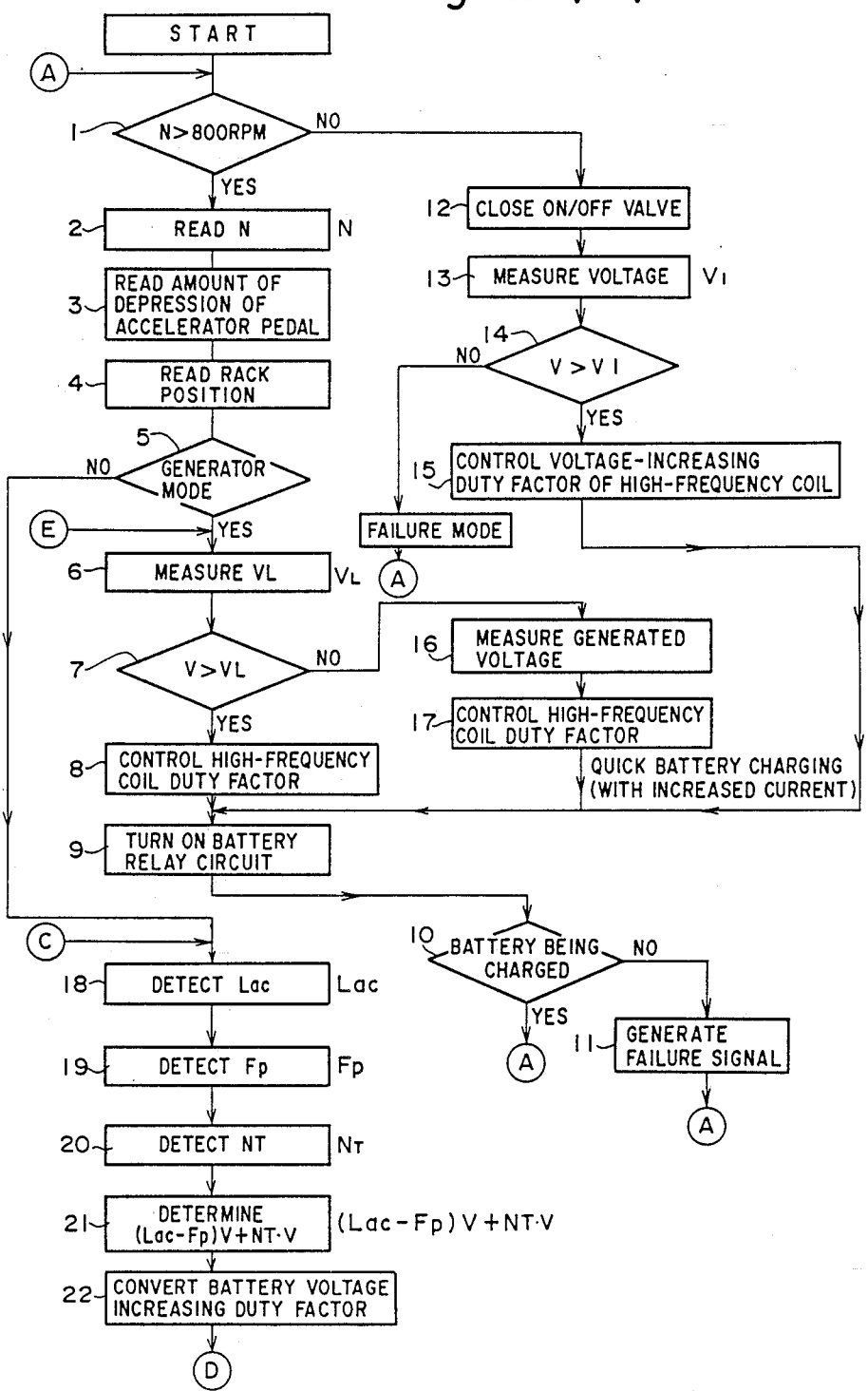
FIGS. 2(A) and 2(B) are a flowchart of operation of the controlling device of the present invention.
Figure 2:
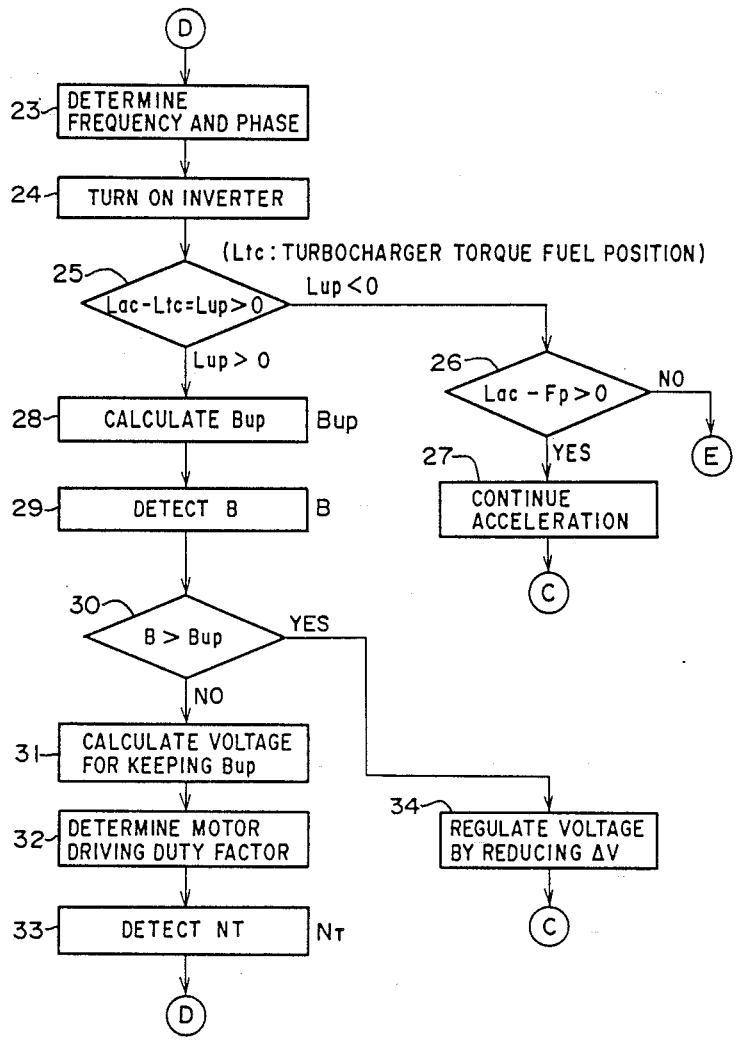

FIGS. 2(A) and 2(B) are a flowchart of an operation sequence of the controlling device of the present invention. Now, operation of the controlling device will be described below with reference to FIGS. 2(A) and 2(B).

Figure 3:
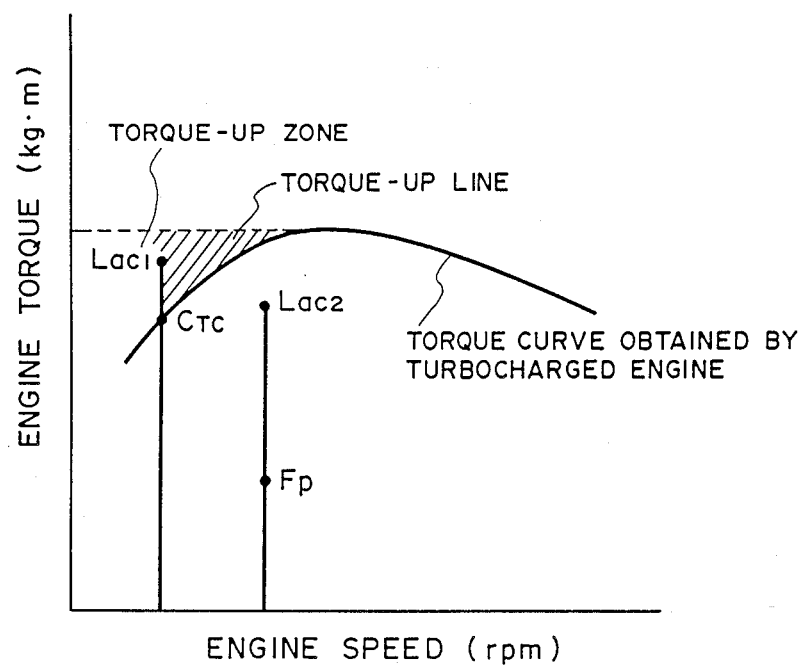
FIG. 3 is a graph showing the relationship the rotational speed of an engine and the torque produced thereby.

A step 1 checks the rotational speed of the engine 1 based on a signal from the speed sensor 15. If the rotational speed is higher than 800 RPM, for example, then control goes to a step 2 in which the engine rotational speed NE is read based on a signal from the engine speed sensor 15. A step 3 then reads in the amount of the depression of the accelerator pedal based on signal from the accelerator pedal movement sensor 13. The rack position is then read based on a signal from the engine load sensor 14 in a step 4. A step 5 then determines whether the electric rotary machine 3 is to operate in a generator mode or a motor mode, based on the engine speed, the accelerator pedal depression, and the rack position which have been read in the steps 2, 3 and 4. More specifically, as shown in FIG. 3, the electric rotary machine 3 operates in the motor mode when the accelerator pedal is in a position Lac1 in a low-speed torque-up zone wherein the engine torque should be increased beyond an engine torque Ctc that is produced upon operation of the turbocharger only by the energy of exhaust gases from the engine, or when the accelerator pedal is in a position Lac2 greater than a fuel rack position Fp for acceleration. Otherwise, the electric rotary machine 3 operates in the generator mode.

If the electric rotary machine 3 is to operate in the generator mode, a voltage VL generated by the electric rotary machine 3 is measured in a step 6, and compared with a battery voltage V in a step 7. If $V > VL$, then the duty factor of a high-frequency coil is controlled in a step 8, a battery relay circuit is turned on in a step 9, and it is confirmed whether the battery is being charged in a step 10. If the battery is not being charged, then a failure signal is generated in a step 11.

If $N < 800$ RPM in the step 1, control goes to a step 12 in which the actuator 27 is operated to close the on/off valve 26 for increasing the speed of flow of exhaust gases to increase the rotational speed of the turbocharger. Then, a voltage V1 generated by the electric rotary machine 3 is measured in a step 13, which is followed by a step 14 that compares the generated voltage V1 due to the increased exhaust gas speed and the battery voltage V. If $V > V1$, then the duty factor for increasing the voltage across the high-frequency coil of the power converter 4 is controlled in a step 15 to equalize the generated voltage to the battery voltage, after which control goes to the step 9.

If $V > V1$ in the step 7, then the generated voltage V is measured in a step 16, and the duty factor of the high-frequency coil is controlled in a step 17 to increase the current for quickly charging the battery, after which control goes to the step 9. Since the electric rotary machine 3 is a permanent-magnet generator, the voltage generated thereby increases as the rotational speed of the rotor 31 increases. In most cases, therefore, the generated voltage is higher than the battery voltage.

If the low-speed torque-up zone or the acceleration is confirmed in the step 5, control jumps to a step 18 for switching the electric rotary machine 3 into the motor mode. The step 18 detects the accelerator pedal position Lac based on the signal from the accelerator pedal movement sensor 13. Then, the fuel rack position Fp of the fuel injection pump is detected from the signal from the engine load sensor 14 in a step 19. The turbine speed NT is detected from the AC frequency of the electric rotary machine 3 in a step 20, and then an acceleration voltage which is the sum of the voltage NT·V determined by the engine speed and the voltage (Lac−Fp)·V corresponding to Lac−Fp, i.e., the voltage corresponding to NT·V+(Lac−Fp)·V, is determined in a step 21. Thereafter, the duty factor for increasing the voltage with respect to the battery is converted in a step 22, the frequency and the phase are determined in a step 23, and the inverter for driving the motor is turned on in a step 24 Once the inverter is turned on, only the conditions of the phase and the voltage are changed.

A next step 25 determines whether a low-speed torque increase is necessary or not. More specifically, the step 25 determines whether the difference between the accelerator pedal position Lac and a turbocharger torque fuel position Ltc according to the engine speed N (corresponding to a general turbocharged engine fuel position), i.e., $Lac - Ltc = Lup$, is positive or negative.

If $Lup < 0$, then control goes to a step 26 to ascertain the degree to which the acceleration is achieved, by determining whether the difference between the accelerator pedal position Lac and the rack position Fp of the fuel injection pump is zero (0) or not. If Lac−Fp is zero i.e., if the rack position Fp coincides with the accelerator pedal position Lac, then the electric rotary machine 3 is set to generator mode, and control goes to the step 6.

If Lac−Fp>0 in the step 26, the rack position Fp does not reach the accelerator pedal position Lac, and hence the motor mode is maintained, and control goes to a step 27 to continue the acceleration.

If Lup>0 in the step 25, a boost pressure increase Bup corresponding to Lup is calculated in a step 28. In this case, the accelerator pedal position is in the low-speed torque-up zone, above the torque curve Ctc plotted when the turbocharger is operated only by the exhaust energy from the engine. The boost pressure increase is calculated from the accelerator pedal position Lac. It is necessary to supply electric power up to the voltage which is capable of maintaining the boost pressure, the present boost pressure B is detected from the boost sensor 16 in a step 29, and the present boost pressure B and the boost pressure increase Bup are compared in a step 30. If B<Bup, then the voltage required to keep Bup is calculated in a step 31, the corresponding duty factor for driving the motor is determined in a step 32, and the turbine speed NT is detected in a step 33, after which control goes back to the step 23.

If B>Bup in the step 30, then the acceleration voltage is reduced by ΔV in a step 34, and control returns to the step 18.

With the present invention, as described above, the engine speed, the accelerator pedal position, and the fuel rack position are checked at all times to achieve an optimum boost pressure which is required for quick acceleration dependent on the running condition of the motor vehicle. Therefore, the response of the engine is increased, making it possible to drive the motor vehicle through quick maneuvering efforts.

Furthermore, it is determined whether the boost pressure required by the engine according to the amount of depression of the accelerator pedal is in excess of the boost pressure generated from the turbocharger only by the energy of exhaust gases emitted from the engine. When an appropriated increase in the low-speed torque is required, the electric rotary machine is supplied with electric power to increase the boost pressure developed by the turbocharger for thereby producing a low-speed torque corresponding to the driver's intention.

Although a certain preferred embodiment has been shown and described, it should be understood that many changes and modifications may be made therein without departing from the scope of the appended claims.

What is claimed is:

1. A device for controlling a turbocharger with an electric rotary machine, comprising:
   a turbine mounted on an engine on a motor vehicle and drivable by exhaust gases emitted from the engine;
   a rotatable shaft coupled to said turbine;
   a compressor coupled to said rotatable shaft of delivering air under pressure to said engine;
   an electric rotary machine coupled to said rotatable shaft;
   an engine speed sensor for detecting the rotational speed of the engine;
   an engine load sensor for detecting a load on the engine;
   an accelerator pedal movement sensor for detecting the amount of depression of an accelerator pedal which controls operation of said engine;
   a boost pressure sensor for detecting the pressure of air supplied to said engine;
   a turbine speed sensor for detecting the rotational speed of said turbine;
   a battery mounted on said motor vehicle;
   means for determining whether said electric rotary machine is in a generator mode or a motor mode based on signals from said engine speed sensor, said engine load sensor, and said accelerator pedal movement sensor;
   means for calculating electric power to be supplied to said electric rotary machine based on signals from said engine load sensor, said accelerator pedal movement sensor, and said turbine speed sensor when said electric rotary machine is in the motor mode; and
   means for supplying the electric power calculated by said calculating means from said battery to said electric rotary machine.

2. A device according to claim 1, wherein said calculating means includes means for adding electric power corresponding to the rotational speed of the turbine based on a signal from said turbine speed sensor and electric power corresponding to the difference between the amount of depression of the accelerator pedal and the load on the engine, to calculate electric power which is required to be supplied to said electric rotary machine.

3. A device according to claim 2, wherein said calculating means includes means for calculating a required turbocharger boost pressure corresponding to the amount of depression of the accelerator pedal if the amount of depression of the accelerator pedal is larger than a turbocharger torque fuel position, for comparing the required boost pressure and the present boost pressure detected by said boost pressure sensor, and for calculating electric power required to maintain the required boost pressure if the required boost pressure is higher than the present boost pressure.

4. A device according to claim 1, wherein said calculating means includes power regulating means for calculating a required turbocharger boost pressure corresponding to the amount of depression of the accelerator pedal if the amount of depression of the accelerator pedal is larger than a turbocharger torque fuel position, for comparing the required boost pressure and the present boost pressure detected by said boost pressure sensor, and for reducing electric power to be supplied to the electric rotary machine if the required boost pressure is lower than the present boost pressure.

* * * * *

UNITED STATES PATENT AND TRADEMARK OFFICE
CERTIFICATE OF CORRECTION

PATENT NO. : 4,878,347
DATED : NOVEMBER 7, 1989
INVENTOR(S) : HIDEO KAWAMURA

It is certified that error appears in the above-identified patent and that said Letters Patent is hereby corrected as shown below:

Col. 1, line 13, "o" should be --of--;
       line 19, "o" should be --of--.

Col. 3, line 53, after "on" insert --a--.

Col. 4, line 26, "V1" should be --VL--;
       line 53, "24 Once" should be --24. Once--.

Col. 5, line 59, "of" should be --for--.

Signed and Sealed this

Fourth Day of September, 1990

Attest:

HARRY F. MANBECK, JR.

*Attesting Officer*        *Commissioner of Patents and Trademarks*